United States Patent
Mannheim Astete et al.

(10) Patent No.: US 11,629,093 B2
(45) Date of Patent: Apr. 18, 2023

(54) GLASS FRITS FOR ION-EXCHANGEABLE GLASSES

(71) Applicant: AGP America S.A., Ciudad de Panama (PA)

(72) Inventors: Mario Arturo Mannheim Astete, Lima (PE); Ivan Arturo Cornejo, Lima (PE)

(73) Assignee: AGP America S.A., Panama (PA)

( * ) Notice: Subject to any disclaimer, the term of this patent is extended or adjusted under 35 U.S.C. 154(b) by 69 days.

(21) Appl. No.: 16/651,439

(22) PCT Filed: Sep. 29, 2018

(86) PCT No.: PCT/IB2018/057594
§ 371 (c)(1),
(2) Date: Mar. 27, 2020

(87) PCT Pub. No.: WO2019/064280
PCT Pub. Date: Apr. 4, 2019

(65) Prior Publication Data
US 2020/0299183 A1    Sep. 24, 2020

Related U.S. Application Data

(60) Provisional application No. 62/566,412, filed on Sep. 30, 2017.

(51) Int. Cl.
*C03C 8/08* (2006.01)
*C03C 21/00* (2006.01)

(52) U.S. Cl.
CPC .............. *C03C 8/08* (2013.01); *C03C 21/002* (2013.01)

(58) Field of Classification Search
None
See application file for complete search history.

(56) References Cited

U.S. PATENT DOCUMENTS

| | | | |
|---|---|---|---|
| 4,684,389 A | 8/1987 | Boaz | |
| 4,959,090 A | 9/1990 | Reinherz | |
| 5,938,834 A | 8/1999 | Boaz | |
| 2002/0051870 A1 | 5/2002 | Honjo et al. | |
| 2011/0183118 A1 | 7/2011 | Lamberson et al. | |
| 2012/0052275 A1* | 3/2012 | Hashimoto | C03C 3/087 501/67 |
| 2016/0002104 A1 | 1/2016 | Lehuede et al. | |

FOREIGN PATENT DOCUMENTS

CN      105143131 A      12/2015

* cited by examiner

*Primary Examiner* — Karl E Group
*Assistant Examiner* — Cameron K Miller
(74) *Attorney, Agent, or Firm* — The Morales Law Firm; Joseph L. Morales, Esq.

(57) ABSTRACT

Strengthened glass substrates with glass fits and methods for forming the same are disclosed. According to one embodiment, the present invention provides a glass frit with a coefficient of thermal expansion less than or equal to the coefficient of thermal expansion of the glass substrate where it is going to be painted. The glass frit of the present invention has similar ion exchange properties to the glass substrate that is going to be used to paint with the glass frit allowing the glass substrate to be ion-exchanged. The glass frit of the present invention is mixed with an organic carrier.

11 Claims, 3 Drawing Sheets

GLASS FRITS FOR ION-EXCHANGEABLE GLASSES

FIELD OF THE INVENTION

The present invention relates generally to methods and products for the design of colored frits for glass substrates which are chemically strengthened by an ion exchange process.

BACKGROUND OF THE INVENTION

The tendencies in the automotive industry are aimed to reducing the weight of automotive glass, while maintaining or enhancing mechanical performance of the glazing product. One way to reduce weight is by using thinner glass than the standard glass used today but with superior mechanical properties. Chemical strengthening a glass will improve the mechanical performance of the set while allowing the manufacturers to reduce weight. However, a person versed in the art will recognize that glass subjected to an ion exchange process are practically impossible to paint with inorganic colored frits due to the high temperature required to vitrify the frit. Furthermore, if painted first and then ion exchanged, the frit will act as a barrier for the ions to exchange and thus will reduce significantly the mechanical performance of the set. Therefore, inventing frits that can be chemically strengthened at the same time with the glass, is highly desired for the industry.

A frit is a granulated glass composition which has been formed by rapidly cooling the melted glass or formed object in a quenching liquid or granulated.

A person skilled in the art understands that glass is a thermodynamically unstable material, so when the glass is subject to a grind process, it becomes more unstable. One purpose of frits is to paint, decorate, seal and improve durability of a ware. Inorganic frits are glass which may be of different colors, the usable particle sizes being about 5 μm to 300 μm, preferably 10 μm to 200 μm.

Frits are widely used in the automotive industry, mainly in paints that are used for the edges of automotive glass as an obscuration or as electrically conductive guides.

In automotive applications, the glass most commonly used is soda lime having a coefficient of thermal expansion (CTE) of about 80 to 90×$10^{-7}$ $K^{-1}$ between 25 and 300° C., and, therefore, most of the frits in the market have been produced to match the CTE of soda lime glass A common practice in the automotive manufacturing processes is to paint the glass while it is flat, then the glass is vitrified and then curved. However, this sequence of events in the manufacturing process is not possible for ion exchanged glass due to relaxation of compressive forces imprinted by the ion exchange process due to the high temperatures at which the glass is subjected during vitrification and the curving process.

To the best of the inventors' knowledge, there are no frits in the market to which an ion exchange can be performed after painted and vitrified on the glass. Therefore, the process commonly performed for curving fritted automotive glass cannot be done on glass in which an ion exchange process is required, such as Gorilla Glass®, Xensation®, Xensation 3D®, Dragon® Trail®, etc.

Ion exchange strengthening is used to improve the mechanical resistance of glass in numerous applications ranging from hand-held consumer electronics to automotive glazing. Ion exchange strengthening is of particular interest in automotive glazing in order to minimize weight and improve mechanical performance. For some conventional automotive glazing, mechanical performance can be improved by thermally tempering soda-lime silica glass to induce surface compressive stresses and improve the resistance of the glazing to mechanical failure following damage such as scratches, chips, impacts or the like. However, the process of thermal tempering is almost impossible for glass beyond a certain thickness, limiting the weight reduction of the glaze.

BRIEF DESCRIPTION OF THE INVENTION

It is an object of the invention to provide a glass frit composition that allows painting on one side of a glass substrate with a glass frit and then carry out an ion exchange process, ensuring that the ion exchange process is carried out around the entire glass substrate, including the part of the glass substrate where the frit is placed. The glass frit of the present invention allows the ion exchange bath molecules to pass through the frit and the ion exchange process to take place. This object can be attained by a combination of features described in the independent claims.

In accordance with one aspect of the invention, there is provided a glass frit composition for ion-exchangeable glass substrates, the composition comprising the following components in weight percent:

TABLE 1

| Component | % |
|---|---|
| $SiO_2$ | 50-60 |
| $Al_2O_3$ | 15-20 |
| CaO | 3-5 |
| $Fe_2O_3$ | 1-2 |
| $Na_2O$ | 10-13 |
| MgO | 3.5-4 |
| $K_2O$ | 3-3.5 |
| $P_2O_5$ | 0-0.5 |
| $TiO_2$ | 0-0.5 |
| BaO | less than or equal to 0.2 |
| MnO | 0-0.5 |
| $SnO_2$ | 0.2-0.4 |

Note that, in Table 1, the weight percent is expressed with respect to the weight of the oxide that comprises the component shown in Table 1 as the main component.

In accordance with a second aspect of the invention, there is provided a glass substrate comprising a sintered glass frit on at least a portion of at least one surface of said glass substrate. The sintered glass frit is formed from a glass frit paste comprising a glass frit composition as described above, and an organic carrier. In addition, the glass frit composition has a coefficient of thermal expansion less than or equal to that of the glass substrate; and wherein the entire glass substrate, including the at least a portion where the sintered glass frit is placed, is ion exchanged.

In accordance with a third aspect of the invention, there is provided a method for forming a glass frit on an ion exchangeable glass substrate, the method comprising: providing a glass frit composition as described above, wherein said glass composition has a coefficient of thermal expansion less than or equal to that of the glass substrate; milling the glass frit composition to provide a powder composition; mixing said powder composition with an organic carrier, so that a glass frit paste is obtained; applying the glass frit paste on at least a portion of at least one surface of said glass substrate; heating the glass substrate having said glass frit paste thereon in a furnace to a temperature so that, after heating, the glass frit is sintered and bonded to the glass substrate; and subjecting the glass substrate having the sintered glass frit to an ion-exchange process.

As can be noted, the present invention discloses a curve of suggested viscosities for the manufacture of frits with coefficient of thermal expansion less or equal to the substrates to be painted and which melts at lower or same temperatures.

Also, the present invention provides a frit having the following characteristics:
a frit with a coefficient of thermal expansion less than or equal to the coefficient of thermal expansion of the glass substrate where it is going to be painted;
a frit with similar ion exchange characteristics to the glass substrate that is going to be used to paint with the frit.

Finally, an additional object of the present invention relates to the design of colored frits which allows the ion exchange or chemical tempering process in glass with different thermal expansion coefficients.

BRIEF DESCRIPTION OF THE DRAWINGS

For the purposes of illustration, there are forms shown in the drawings that are presently preferred, it is understood, however, that the embodiments disclosed and discussed herein are not limited to the precise arrangements and instrumentalities shown.

DETAILED DESCRIPTION OF THE INVENTION

According to the foregoing, the present invention consists in the design of ion exchangeable or chemical tempered color frits for the automobile glazing industry. Currently ion exchangeable glass are being used in the automobile industry as a way to minimize weight and improve mechanical performance; however, these glass cannot be painted with existent paint frits because the ion exchange process is blocked by the paint, thus reducing the compressive stresses to zero, weakening the glass perimeter. The present invention allows the glass to be painted and then be subject to an ion exchange process in the same bath of salt used for the glass substrate.

The prior art shows that when ion exchangeable glass are used in the automobile industry, the glass is first curved, and then ion exchanged, leaving the glass without paint. For other applications where the glass is flat, organic paint can be used. Such types of paints are more expensive and might require additional processes to cure the paint.

Figure 1:
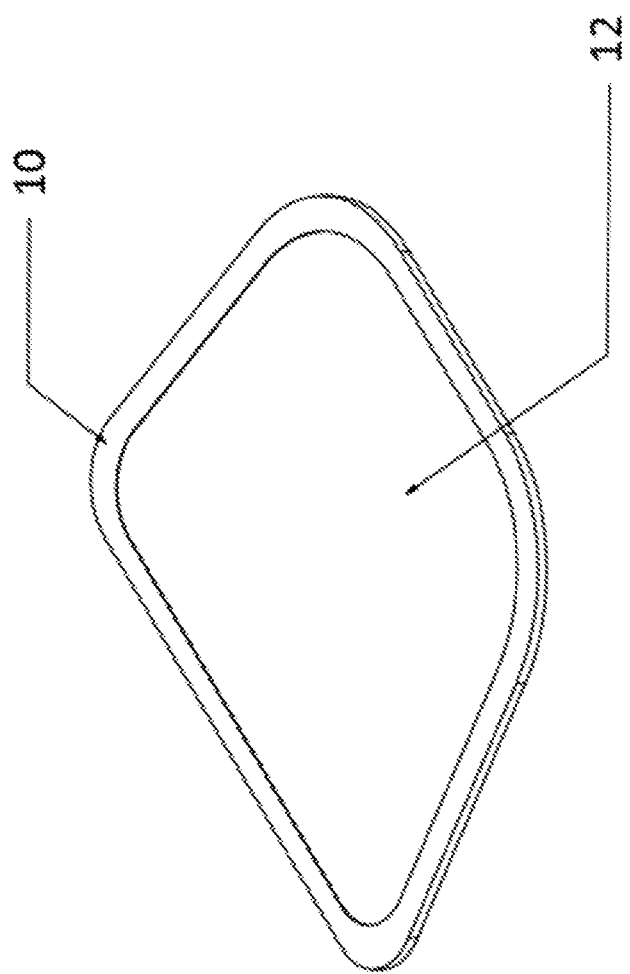
FIG. 1 shows a glass substrate having applied a glass frit on its perimeter according to one or more embodiments shown and described herein.
Figure 2:
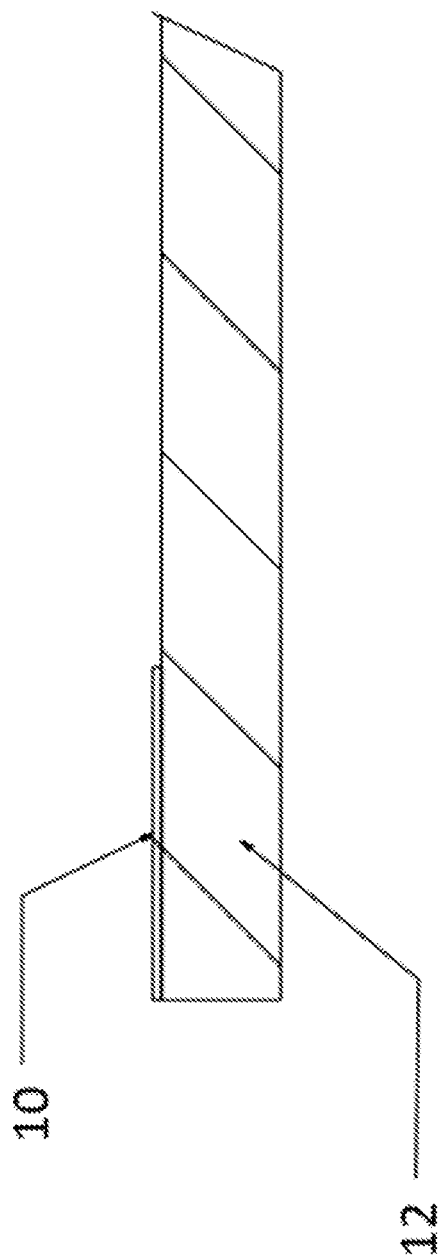
FIG. 2 schematically depicts a partial cross section of the strengthened glass substrate of FIG. 1.

Glass substrates 12, such as automotive glazing and cover glass for electronic devices, may include a glass frit 10 applied to one or more surfaces of the glass substrate (FIGS. 1 and 2). The glass frit 10 may be used to conceal various electrical components that are attached to the glass substrate 12 or which may otherwise be visible through the glass substrate 12. The glass frit 10 is usually applied to the glass substrate 12 and then fired to sinter the glass frit 10 and to bond the glass frit 10 to the glass substrate 12. Conventional glass frits 10 for such applications generally have relatively high softening points and glass transition temperatures and, as such, require relatively high firing temperatures (600° C. to 700° C.) for relatively short periods of time.

The glass frits 10 of the present invention are milled in powder in ranges of particles which allow to be mixed with an organic carrier. Afterwards, the powdered glass is mixed with the organic carrier and mixed in proportions such that they can be made in different proportions. In various embodiments of the invention, the proportion of ground glass to organic carrier is greater than or equal to 60:40, and preferably about 70:30.

The organic carrier which is not part of the invention could be a mixture of pine oil with ethyl cellulose (or any other suitable material). Said material is like a paint or a varnish that mixes a specific proportion to form a paste. The paste is then impregnated on at least a portion of one or more surfaces of the glass substrate 12 by different means, for example by screen printing or spray or any other impregnation method on the glass, without limitation by similar deposition techniques.

After impregnating the paint on the glass substrate 12, the paint is dried, binders are burned out, and then fully vitrified. While the figures depicts the paste as being deposited on the perimeter edge of the glass substrate 12, it should be understood that the paste may be applied to various locations on the surfaces of the glass substrate 12 or even on the edges of the glass substrate 12.

EXAMPLE 1

Table 2 shows the compositions of two black frits developed for two commercially available specialty glass.

TABLE 2

| Compositions of two black frits | | |
|---|---|---|
| Oxide | AGP-1 | AGP-2 |
| $SiO_2$ | 57.3% | 58.4% |
| $Al_2O_3$ | 18.0% | 17.6% |
| CaO | 3.8% | 3.0% |
| $Fe_2O_3$ | 1.4% | 1.1% |
| $Na_2O$ | 10.4% | 11.2% |
| MgO | 3.7% | 3.7% |
| $K_2O$ | 3.4% | 3.4% |
| $P_2O_5$ | 0.3% | 0.2% |
| $TiO_2$ | 0.4% | 0.3% |
| Cl | 0.1% | 0.1% |
| $SO_3$ | 0.1% | 0.1% |
| BaO | 0.2% | 0.2% |
| $Cs_2O$ | 0.1% | 0.1% |
| MnO | 0.1% | 0.1% |
| $SnO_2$ | 0.3% | 0.4% |
| TOTAL | 99.7% | 99.8% |

Figure 3:
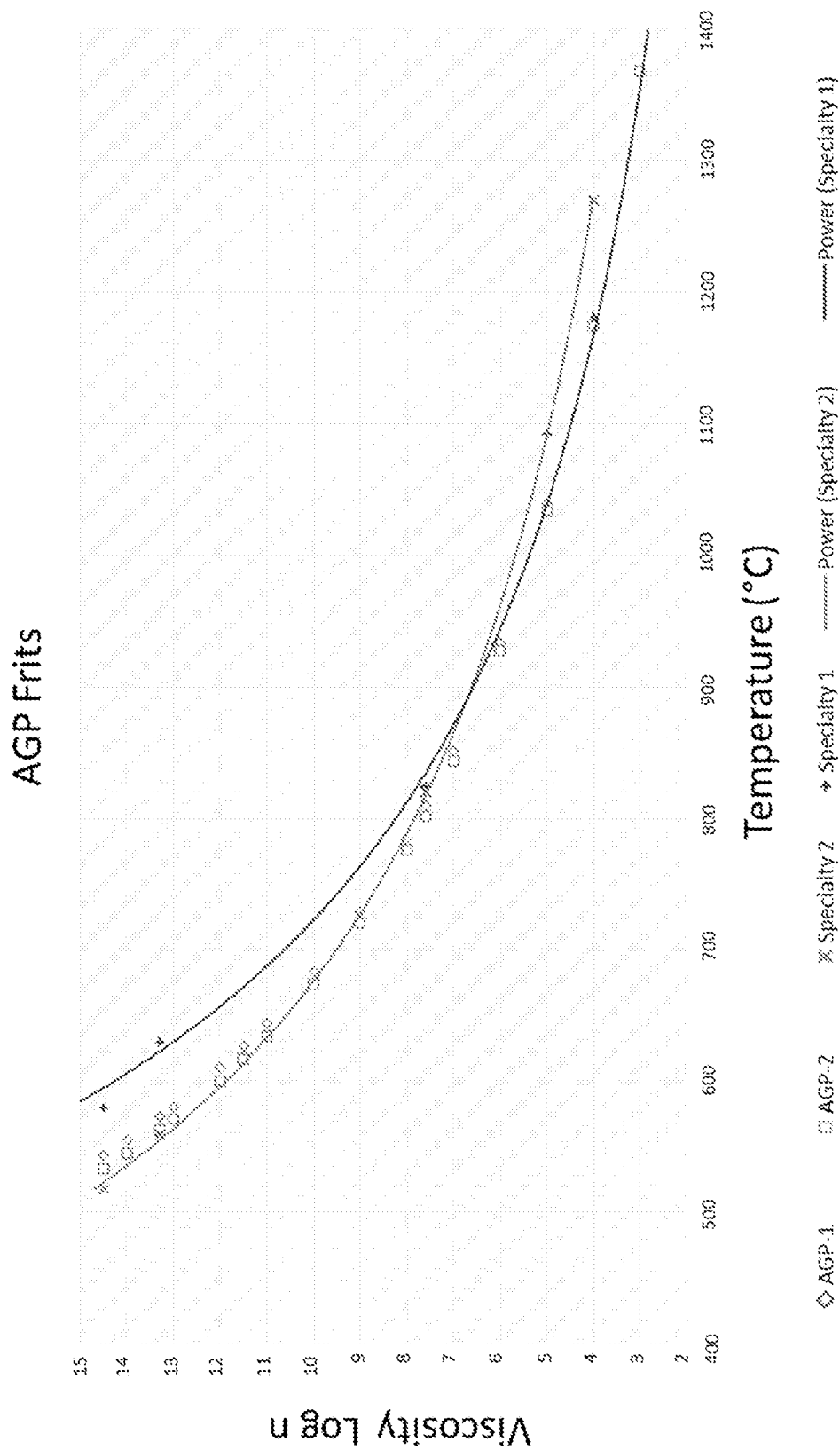
FIG. 3 graphically depicts the viscosity as a function of temperatures between two glass frits and two commercially available specialty glass in an exemplary glass frit composition.

Both compositions (AGP1 and AGP2) can be ion exchanged in a potassium bath. The viscosity curves are shown in FIG. 3 wherein AGP1 and AGP2 glass have viscosity properties similar to both specialty glass.

It must be understood that this invention is not limited to the embodiments described and illustrated above. A person skilled in the art will understand that numerous variations and/or modifications can be carried out that do not depart from the spirit of the invention, which is only defined by the following claims.

The invention claimed is:

1. A glass substrate, comprising:
a sintered glass frit on at least a portion of at least one surface of said glass substrate;
wherein the sintered glass frit is formed from a glass frit paste comprising: a glass frit composition, the composition comprising the following components in weight percent:

| Component | % |
|---|---|
| $SiO_2$ | 50-60 |
| $Al_2O_3$ | 15-20 |
| CaO | 3-5 |
| $Fe_2O_3$ | 1-2 |
| $Na_2O$ | 10-13 |
| MgO | 3.5-4 |
| $K_2O$ | 3-3.5 |
| $P_2O_5$ | 0-0.5 |
| $TiO_2$ | 0-0.5 |
| BaO | less than or equal to 0.2 |
| MnO | 0-0.5 |
| $SnO_2$ | 0.2-0.4; | and
an organic carrier;
wherein the glass frit composition has a coefficient of thermal expansion less than or equal to that of the glass substrate; and
wherein the entire glass substrate, including the at least a portion where the sintered glass frit is placed, is ion exchanged.

2. The glass substrate of claim 1, wherein the proportion of glass frit composition to organic carrier is greater than 60:40.

3. The glass substrate of claim 1, wherein the ion-exchanged glass substrate has a depth of layer greater than or equal to 10 μm and a compressive stress greater than or equal to 400 Mpa.

4. A method for forming a glass frit on an ion exchangeable glass substrate, the method comprising:
providing a glass frit composition, wherein said glass composition has a coefficient of thermal expansion less than or equal to that of the glass substrate;
milling the glass frit composition to provide a powder composition;
mixing said powder composition with an organic carrier, so that a glass frit paste is obtained;
applying the glass frit paste on at least a portion of at least one surface of said glass substrate;
heating the glass substrate having said glass frit paste thereon in a furnace to a temperature so that, after heating, the glass frit is sintered and bonded to the glass substrate; and
subjecting the glass substrate having the sintered glass frit to an ion-exchange process;
wherein the glass frit composition comprises the following components in weight percent:

| Component | % |
|---|---|
| $SiO_2$ | 50-60 |
| $Al_2O_3$ | 15-20 |
| CaO | 3-5 |
| $Fe_2O_3$ | 1-2 |
| NaO | 10-13 |
| MgO | 3.5-4 |
| $K_2O$ | 3-3.5 |
| $P_2O_5$ | 0-0.5 |
| $TiO_2$ | 0-0.5 |
| BaO | less than or equal to 0.2 |
| MnO | 0-0.5 |
| $SnO_2$ | 0.2-0.4. |

5. The method of claim 4, further comprising, between the step of heating the glass substrate in a furnace and the step of subjecting the glass substrate to an ion-exchange process, the step of: cooling the glass substrate having the sintered glass frit.

6. The method of claim 4, wherein the provided powder composition has an average particle size in the range of about 5 μm to 300 μm.

7. The method of claim 4, wherein the proportion of powder composition to organic carrier is greater than 60:40.

8. The method of claim 4, wherein the ion-exchanged glass substrate has a depth of layer greater than or equal to 10 μm and a compressive stress greater than or equal to 400 Mpa.

9. The glass substrate of claim 1, wherein the proportion of glass frit composition to organic carrier is about 70:30.

10. The method of claim 4, wherein the provided powder composition has an average particle size in the range of about 10 μm to 200 μm.

11. The method of claim 4, wherein the proportion of powder composition to organic carrier is about 70:30.

* * * * *